United States Patent [19]

Speer et al.

[11] 4,083,261

[45] Apr. 11, 1978

[54] ENDLESS POWER TRANSMISSION BELT

[75] Inventors: Billy L. Speer; Richard L. Bushong, both of Springfield, Mo.

[73] Assignee: Dayco Corporation, Dayton, Ohio

[21] Appl. No.: 788,379

[22] Filed: Apr. 18, 1977

[51] Int. Cl.² ............................ F16G 5/16; F16G 1/00
[52] U.S. Cl. ..................................... 74/233; 74/231 P
[58] Field of Search ...................... 74/231 P, 233, 234; 156/137

[56] References Cited

U.S. PATENT DOCUMENTS

| 3,404,577 | 10/1968 | Zahn | 74/229 |
|---|---|---|---|
| 3,987,684 | 10/1976 | Fisher et al. | 74/231 P |
| 4,031,768 | 6/1977 | Henderson et al. | 74/233 |

Primary Examiner—Leonard H. Gerin
Attorney, Agent, or Firm—Reuben Wolk

[57] ABSTRACT

An endless power transmission belt is provided and comprises a tension section, a compression section, and a load-carrying means bonded between the sections with at least one of the sections having at least one laminated layer and with the laminated layer having a greige fabric and a polymeric material laminated thereagainst with the greige fabric and laminated layer having a thickness ratio therebetween defined by an empirical equation whereby precise control of the polymeric material enables such polymeric material to serve as an anti-shear cushion which protects the greige fabric.

20 Claims, 3 Drawing Figures

ENDLESS POWER TRANSMISSION BELT

BACKGROUND OF THE INVENTION

Endless power transmission belts having a socalled central neutral axis (CNA) i.e., load-carrying means such as helically wound load-carrying cord disposed midway between the outside and inside surfaces of the belt, are becoming more popular in the belt industry due to their inherent capability of being produced with minimum scrap.

It is common practice in a CNA belt as well as a more conventional belt to employ layers of polymer impregnated fabric at various locations throughout the belt cross section. However, during the operation of such belts around associated sheaves there is repeated flexing and imposition of stresses thereon and particularly on the fabric plies as each belt enters and exits each associated sheave and the stresses on fabric plies is aggravated when employing sheaves of comparatively small diameter. The fabric layers of such belts are usually made of fibers which are comparatively rigid and inelastic and when loading such fibers they and their associated fabric tend to fail prematurely causing premature belt failure.

Heretofore, it was well known that the more conventional belts, i.e., those having their neutral axis close to the outside surface of the belt, performed better if such belts were kept comparatively thin when measured perpendicular to their parallel sides. However, in the course of CNA belt development it was found that certain thicker CNA belts gave better performance which led to this invention. In particular it was found that there is an optimum amount of polymeric material that can be disposed against greige fabric to provide improved performance without belt delamination.

SUMMARY

It is a feature of this invention to provide an endless power transmission belt which is of simple and economical construction and which employs polymer-laminated fabric layers which do not tend to fail or delaminate from the belt body.

Another feature of this invention is to provide a belt of the character mentioned which has a comparatively long service life.

Another feature of this invention is to provide a belt of the character mentioned which employs at least one laminated layer comprised of greige fabric and polymeric material and wherein the polymeric material serves to cushion and eliminate or substantially reduce stresses imposed on the fabric during belt operation.

Another feature of this invention is to provide an endless CNA belt which employs a laminated layer of the character mentioned wherein the polymeric material thereof has a lower modulus than that part of the belt body adjoining same and such polymeric material serves as a protective cushion for its adjoining greige fabric.

Another feature of this invention is to provide an endless power transmission belt which comprises a tension section, a compression section, and a load-carrying means bonded between the sections with at least one of the sections having at least one laminated layer and with the laminated layer having a greige fabric and a polymeric material laminated thereagainst with the greige fabric and laminated layer having a thickness ratio therebetween defined by an empirical equation whereby precise control of the polymeric material enables such polymeric material to serve as an antishear cushion which protects the greige fabric.

Therefore, it is an object of this invention to provide an endless power transmission belt having one or more of the novel features set forth above or hereinafter shown or described.

Other objects, features, details, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
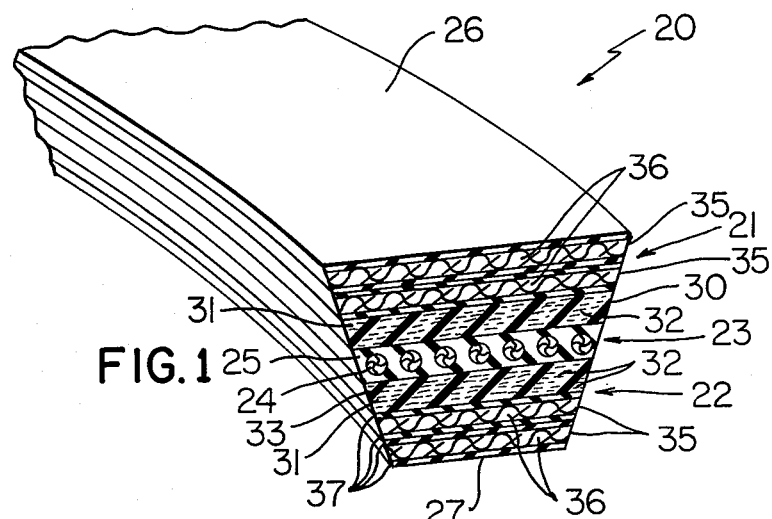
FIG. 1 is a fragmentary perspective view with parts in cross-section, parts in elevation, and parts broken away of one exemplary embodiment of the belt of this invention.

Reference is now made to FIG. 1 of the drawing which illustrates one exemplary embodiment of an endless power transmission belt structure or belt of this invention which is designated generally by the reference numeral 20. The belt 20 comprises a tension section 21, a compression section 22, and load-carrying means bonded between the sections 21 and 22. The load-carrying means 23 is defined by a helically wound load-carrying cord 24 suitably disposed in an elastomeric cushion 25 of any suitable known construction. The belt 20 has an outside surface 26 and an inside surface 27 and the helically wound cord 24 is disposed midway between the surfaces 26 and 27 and thus the centers of the individual turns of the cord are disposed on a rectilinear line parallel to the parallel surface 26 and 27 when viewed in cross-section, whereby the belt 20 has its so-called neutral axis or load-carrying cord 24 centrally disposed and is popularly referred to as a central neutral axis or CNA belt 20.

Figure 2:
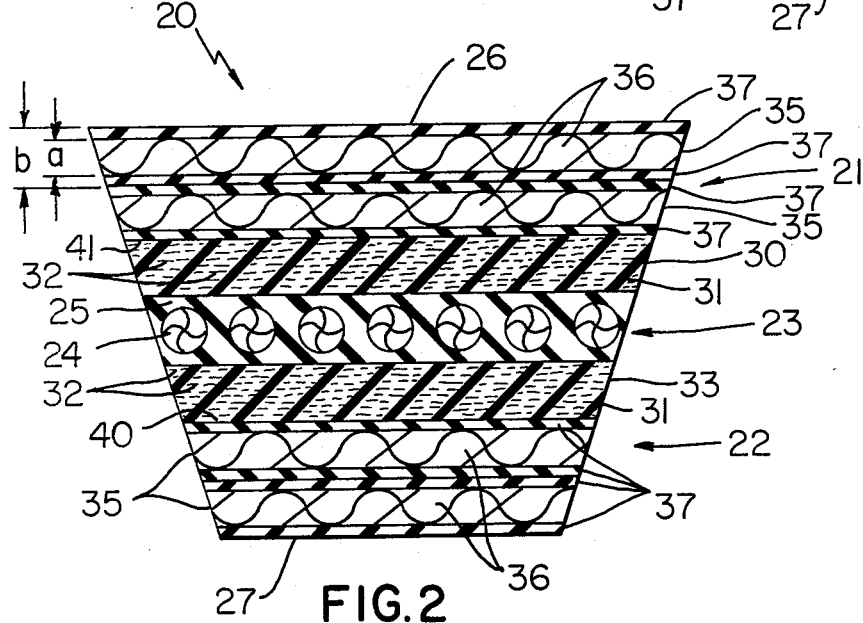
FIG. 2 is an enlarged cross-sectional view of the belt of FIG. 1.

The tension section 21 of belt 20 has an inner portion 30 (FIG. 2) that adjoins the load-carrying section 23 and such inner portion is defined by polymeric matrix in the form of rubber 31 which has randomly distributed fibers 32 disposed therethrough. Accordingly, regardless of the polymeric material used to define the matrix 31 the portion 30 inherently has a comparatively high modulus which is higher than would ordinarily be the case if the matrix 31 were to be provided without fibers 32. The term modulus as used in this disclosure is defined generally as resistance to deformation.

The compression section 22 has an inner portion 33 also defined by a polymeric matrix in the form of a rubber 31 and has randomly distributed fibers 32 throughout. As in the case of portion 30 of section 21, portion 33 of the compression section 22 also has a comparatively high modulus which is substantially the same as the modulus of portion 30.

Each of the sections 21 and 22 has at least one polymer-faced layer therein which will be referred to as a laminated layer; and, in this example of the invention each section 21 and 22 has a plurality of such laminated layers comprising same and for convenience each laminated layer will be designated by the same reference numeral 35. Each laminated layer 35 is comprised of a greige fabric 36 and polymeric material laminated thereagainst in the form of a pair of polymeric layers each designated by the same reference numeral 37 laminated on opposite sides of the greige fabric 36 with such greige fabric being sandwiched centrally therebetween.

Each of the polymeric layers 37 has a modulus which is substantially less than the modulus of the inner portion of its associated section, i.e., portion 30 of section 21 and portion 33 of compression section 22, whereby the polymeric layers 37 serve as anti-shear cushions protecting their adjoining greige fabric against damaging forces tending to damage the greige fabric. The polymeric layers 37 of this example are of substantially equal thickness; however, it is not mandatory that they be of equal thickness.

The greige fabric 36 has a thickness indicated by the letter "a" and the laminated layer 35 has an overall thickness indicated by the letter "b". It has been found empirically that by controlling the thickness ratio indicated by the letter "R" between the greige fabric 36 and the overall laminated layer 35 in which the fabric 36 is used the associated belt provides better performance without failute or delamination of each layer 35. In particular, when the greige fabric and laminated layer have a thickness ratio within the numerical range 0.35 through 0.75 (set forth as 0.035-0.75) optimum results are obtained and this ratio can be expressed by the equation: $R = a/b$ where $R$ is the thickness ratio, $a$ is the thickness of the greige fabric, and $b$ is the overall thickness of the laminated layer. This thickness ratio is substantially less than the ratio of greige fabric to laminated layers in CNA belts proposed heretofore and in such previously proposed CNA belts a similar ratio is generally of the order 0.8 and greater.

The empirical formula is, in essence, setting forth that by providing a substantial thickness for the layers 37, the associated fabric 36 is protected or isolated by its layers 37. For example, it will be seen in FIG. 2 that the innermost greige fabric layer 36 of the compression section 22 is isolated by its adjoining layer 37 at its interface 40 with compression section portion 33. Similarly, the layer 37 of the innermost tension section layer 35 serves to isolate its greige fabric layer 36 at its interface 41 with tension section portion 30. It will also be appreciated that the remaining polymeric layers 37 of the laminated layers 35 of belt 20 cooperate with the layers 37 at interfaces 40 and 41 to isolate their associated greige fabric layers 36 against stresses created during movement of the belt 20 in and out of associated sheaves.

The greige fabric 36 comprising each layer 35 may be in the form of a square woven fabric, i.e., with warps and wefts thereof disposed at 90° to each other, or such greige fabric 36 may be in the form of stress-relieved fabric, i.e., with warps and wefts thereof disposed at an angle between 95° and 155° to each other. Further, it will be appreciated that in each instance, whether in the case of square woven fabric or stress-relieved fabric both the warps and wefts are preferably disposed at an angle to the longitudinal axis of the endless belt 20.

Figure 3:
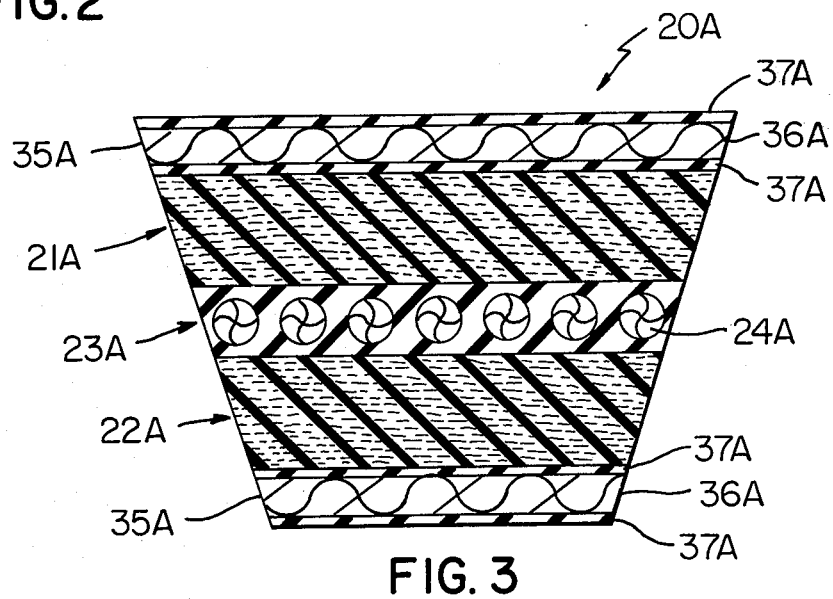
FIG. 3 is a view similar to FIG. 2 illustrating another exemplary embodiment of the belt of this invention.

Another exemplary embodiment of the belt structure or belt of this invention is illustrated in FIG. 3 of the drawing. The belt of FIG. 3 is very similar to the belt 20; therefore, such belt will be designated by the reference numeral 20A and representative parts of the belt 20A which is similar to corresponding parts of the belt 20 will be designated in the drawing by the same reference numeral as in the belt 20 (whether or not such representative parts are mentioned in the specification) followed by the letter designation A and not described again in detail.

The belt 20A has a tension section 21A, a compression section 22A, and a load-carrying section 23A comprised of a centrally disposed helically wound load-carrying cord 24A whereby the belt 20A is also a CNA belt. The main difference between the belt 20A and the belt 20 is that belt 20A has a single laminated layer 35A defining the remote or outer portion of its tension section 21A and a single laminated layer 35 A defining the remote or outer portion of its compression section 22A. The layer 35A is substantially identical to the layer 35 of the belt 20 and the ratio of its greige fabric layer 36A to the overall thickness thereof including both laminated polymeric layers 37A is also expressed by the equation $R = a/b$ and for the same reasons as before.

In this disclosure of the invention the greige fabric comprising laminated layers of each of the belts has been described as being either square woven or stress-relieved fabric with warps and wefts disposed on an angle or bias to the longitudinal axis of the associated belt. However, it will be appreciated that other greige fabrics may be employed provided that the ratio of the thickness of each greige fabric to the overall thickness of the laminated layer in which it is used is in accordance with the formula set forth herein and has a value within the range 0.35-0.75 as defined herein. For example, the greige fabric may be a non-woven fabric, a so-called tire-cord fabric, or the like.

The various portions of the belt of this invention may be made utilizing any suitable material known in the art and the belt of this invention may be made utilizing any suitable belt manufacturing technique.

Although the embodiments of the belt disclosed in the drawing are shown as CNA belts it will be appreciated that any other known type of belt may be made utilizing the teachings of this invention.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising, a tension section, a compression section, and load-carrying means bonded between said sections, at least one of said sections having at least one laminated layer, said laminated layer comprising a greige fabric and a polymeric material laminated thereagainst, said greige fabric and laminated layer having a thickness ratio within the numerical range 0.35-0.75 defined by the equation:

$$R = a/b$$

where $R$ is the thickness ratio, $a$ is the thickness of the greige fabric, and $b$ is the overall thickness of the laminated layer.

2. A belt as set forth in claim 1 in which said polymeric material comprises a pair of polymeric layers having said greige fabric sandwiched therebetween.

3. A belt as set forth in claim 2 in which said polymeric layers are of substantially equal thickness.

4. A belt as set forth in claim 1 in which said greige fabric is a square-woven fabric.

5. A belt as set forth in claim 1 in which said greige fabric is a stress-relieved fabric.

6. A belt as set forth in claim 1 in which said greige fabric is defined by warps and wefts each disposed at an angle to the longitudinal axis of said belt.

7. A belt as set forth in claim 1 in which said one section is comprised of a polymeric matrix having randomly distributed fibers embedded therethrough.

8. A belt as set forth in claim 1 in which said one section is comprised of a portion defined by a polymeric matrix having randomly distributed fibers embedded therethrough, said portion having a particular modulus, said polymeric material comprising said laminated layer having a modulus which is less than the modulus of said portion, said lesser modulus of said polymeric material serving as an anti-shear cushion at the interface of said greige fabric and said portion.

9. A belt as set forth in claim 1 in which said tension section has an outer surface defining the outside surface of said belt said compression has an outer surface defining the inside surface of said belt, and said load-carrying means is disposed midway between said surfaces defining said belt as a CNA belt.

10. A belt as set forth in claim 9 in which said load-carrying means is a helically wound load-carrying cord.

11. An endless power transmission belt comprising, a tension section, a compression section, and load-carrying means bonded between said sections, each of said sections having at least one laminated layer, each laminated layer comprising a greige fabric and polymeric material laminated thereagainst, said greige fabric and its laminated layer having a thickness ratio within the numerical range 0.35–0.75 defined by the equation:

$$R = a/b$$

where R is the thickness ratio, $a$ is the thickness of the greige fabric, and $b$ is the overall thickness of the laminated layer.

12. A belt as set forth in claim 11 in which each of said sections has at least another laminated layer.

13. A belt as set forth in claim 11 in which said polymeric material of each laminated layer comprises a pair of polymeric layers having said greige fabric sandwiched therebetween.

14. A belt as set forth in claim 11 in which said one laminated layer of each section defines the outermost surface of its associated section.

15. A belt as set forth in claim 12 in which said laminated layers of each section adjoin each other and define the outer portion of its associated section.

16. A belt as set forth in claim 13 in which said pair of polymeric layers of each laminated layer are rubber layers of substantially equal thickness.

17. A belt as set forth in claim 16 in which said greige fabric of each laminated layer is a squarewoven fabric.

18. A belt as set forth in claim 16 in which said greige fabric of each laminated layer is a stressrelieved fabric.

19. A belt as set forth in claim 16 in which said greige fabric of each laminated layer is defined by warps and wefts each disposed at an angle to the longitudinal axis of said belt.

20. A belt as set forth in claim 19 in which said load-carrying means is a helically wound load-carrying cord.

* * * * *